A. H. HIEATZMAN.
RIND REMOVING MEAT SLICING MACHINE.
APPLICATION FILED DEC. 6, 1917.
1,376,810.
Patented May 3, 1921.
3 SHEETS—SHEET 1.
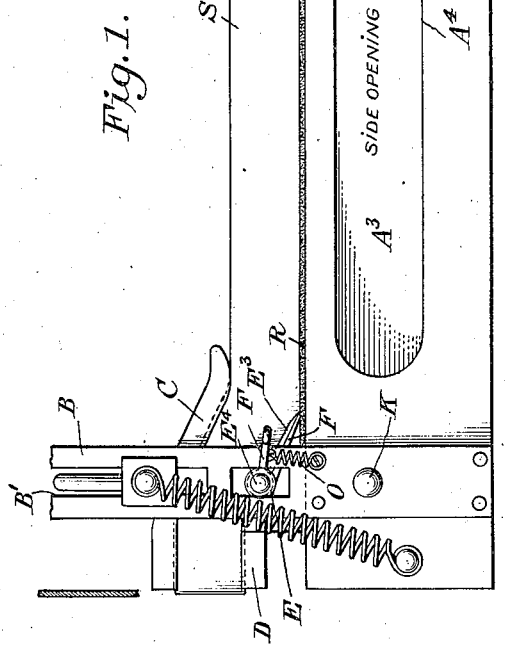
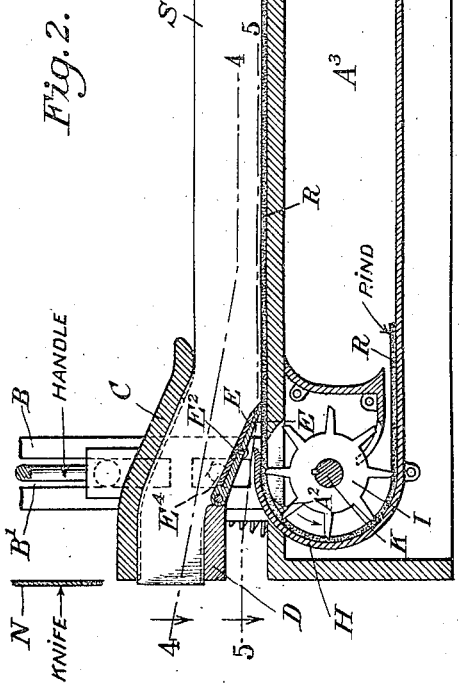

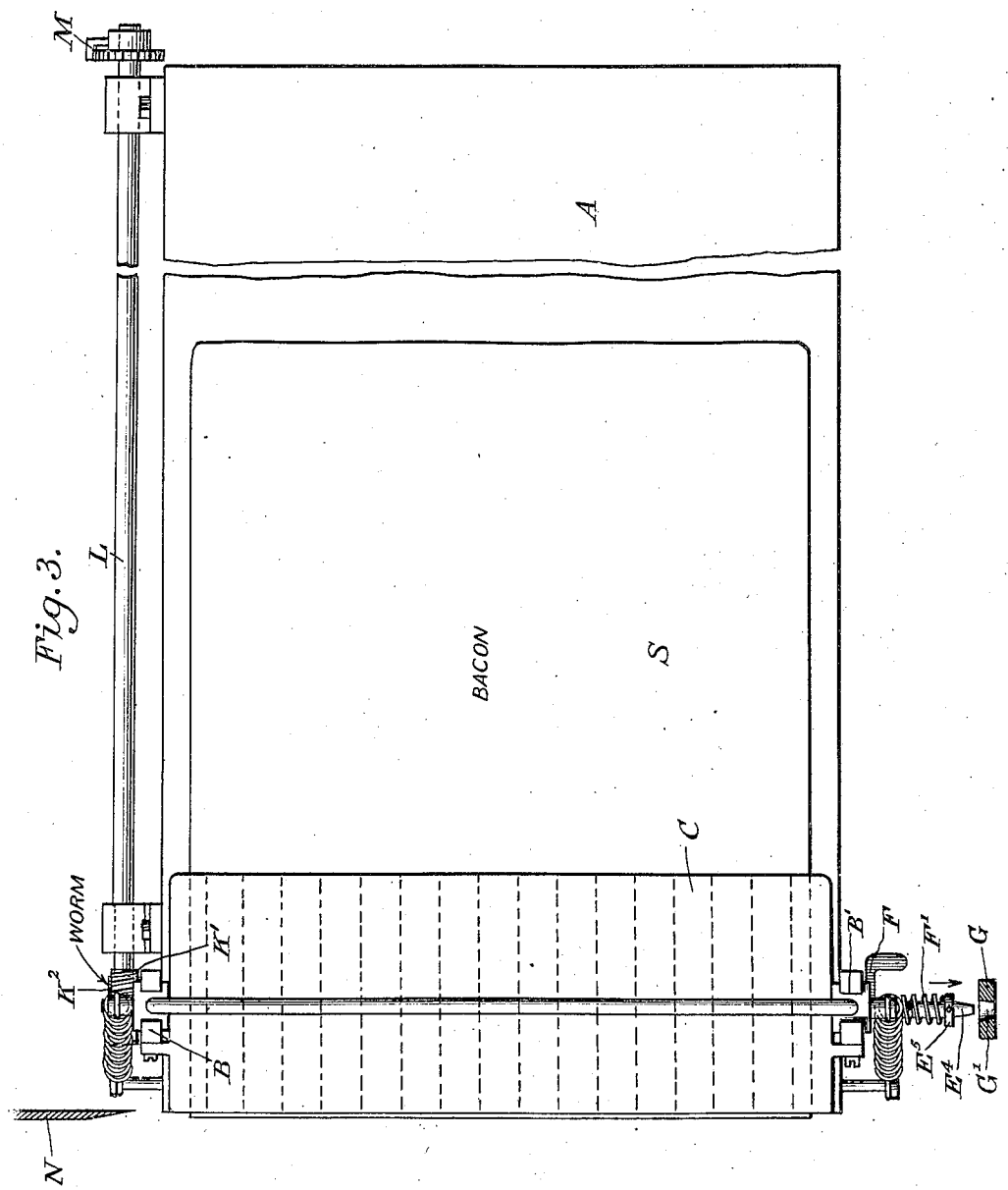

A. H. HIEATZMAN.
RIND REMOVING MEAT SLICING MACHINE.
APPLICATION FILED DEC. 6, 1917.
1,376,810.
Patented May 3, 1921.
3 SHEETS—SHEET 3.
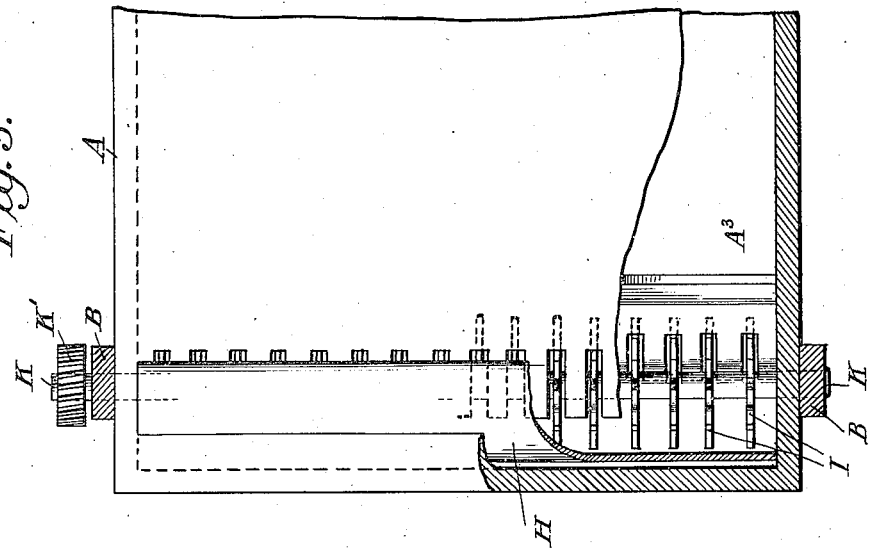
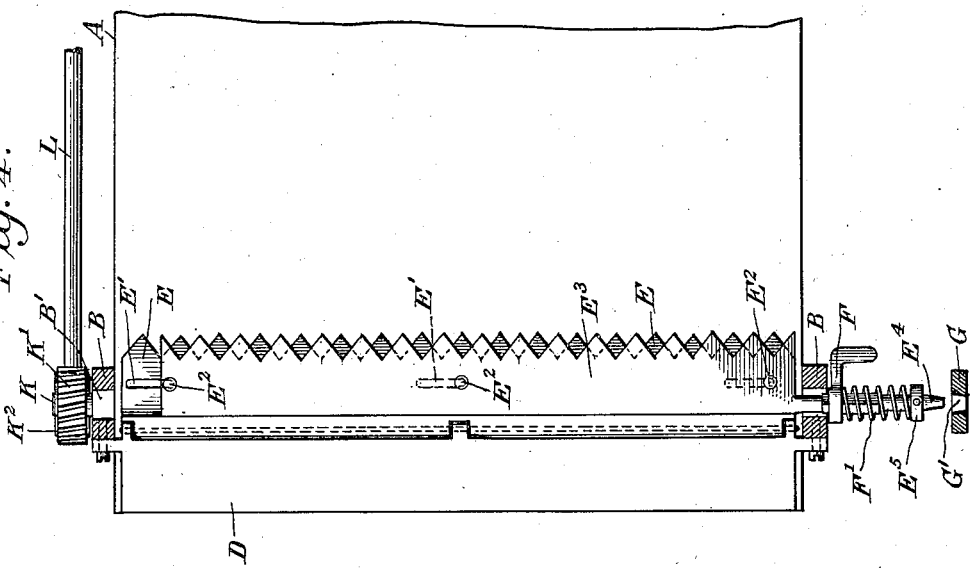
Witness
Fenton Belt
James A Murray
Inventor
Arthur H. Hieatzman

UNITED STATES PATENT OFFICE.

ARTHUR H. HIEATZMAN, OF BALTIMORE, MARYLAND.

RIND-REMOVING MEAT-SLICING MACHINE.

1,376,810.　　　　　Specification of Letters Patent.　　Patented May 3, 1921.

Application filed December 6, 1917. Serial No. 205,864.

*To all whom it may concern:*

Be it known that I, ARTHUR H. HIEATZMAN, a citizen of the United States, residing at Baltimore city, in the State of Maryland, have invented certain new and useful Improvements in Rind-Removing Meat-Slicing Machines, of which the following is a specification.

My invention relates to rind cutting and removing attachments for slicing machines and has for its object to provide a simple device which will separate the rind from a piece of bacon or other meat, and preserve the rind in one piece or sheet.

A further object is to present a simple mechanism, having a skinning knife which is spring-pressed and yielding, which will bear firmly upon the rind and remove all meat or fat from said rind, while the bacon is being fed forward to the slicing knife.

With these and other objects in view, which will appear in the novel construction, combination and arrangement of the parts hereinafter more fully described and claimed, and shown in the accompanying drawings illustrating the invention, and in which,—

Figure 1 is a side elevation of a meat carriage showing my improvement applied thereto.

Fig. 2 is a vertical longitudinal section through the same.

Fig. 3 is a top plan view.

Fig. 4 is a horizontal section taken on line 4—4 of Fig. 2, and

Fig. 5 is a sectional view taken on line 5—5 of Fig. 2.

Referring to the drawings by letter, A represents the reciprocating carriage of a meat slicing machine, provided at its forward end with standards B—B, which have vertical guideways B' for the spring-actuated presser-bar C. A bacon support and guide bar D is secured to the standards B—B and held in a position slightly above the upper surface of the meat table A, and to the inner edge of said bar D is hingedly mounted the toothed finger-bar E which is provided with slots E' to receive the rivets $E^2$, which hold the reciprocating knife $E^3$ in sliding engagement with the finger-bar E. A stem $E^4$ projects from one end of the knife $E^3$ and is squared for a portion of its length for sliding engagement through the finger-piece F which is mounted thereon, and a collar $E^5$ is fixed to the stem $E^4$ near its outer end, and a coiled spring F' is interposed between the said collar $E^5$ and finger-piece F, to hold the knife normally in one position through the medium of the rivets and slots $E^2$ and E'. An arm G is secured to the frame of the machine (not shown) and has an opening G' through which the end of the arm $E^4$ is adapted to pass, when the reciprocating meat table is in its backward position. It will be seen that when the collar $E^5$ comes in contact with the arm G, the knife $E^3$ will be moved to cut the rind R from the piece of bacon S, and the spring having been compressed, will when the carriage starts forward, move the knife $E^3$ to normal position, thus giving a second cutting action to the said knife.

In placing the bacon S in the machine, the end of the bacon is fed under the presser bar C until the knife $E^3$ is reached, and by taking hold of the finger-piece F, the knife may be started between the rind R and the bacon S and a few movements of the knife will separate a portion of the rind which will pass under the guide or backing H, and down through the slot $A^2$ of the table and be gripped and fed into the rind receptacle $A^3$ under the table, by means of the series of spur disks I, mounted for rotation upon the shaft K, which receives step by step movement through the worm-wheel K' secured to the outer end of the shaft K, and worm $K^2$, mounted on the drive shaft L, suitably journaled on the side of the meat carriage A, said shaft L being provided with the usual pawl and ratchet M to impart intermittent movement to said shaft L as the meat carriage reciprocates back and forth across the face of the slicing knife N, as shown in Fig. 3 of the drawings. By referring to Fig. 1 of the drawings it will be seen that a small spring O is secured to the finger-piece F and having its opposite end fastened to the standard B, the object of said spring is to hold the rind-separating knife in firm contact with the inside of the rind and separate all fat or lean meat from said rind while the bacon is being fed upward and forward to the slicing knife. An opening $A^4$ is provided in the side of the meat carriage to permit of the removal of the whole sheet of rind after it has been separated from the side of bacon.

Having described my invention, what I claim as new and desire to secure by Letters Patent, is:

1. A bacon rind removing machine comprising a table, a knife mounted above and for a transverse intermittent movement across the surface of the table and having its cutting edge spaced from the surface of the table.

2. A bacon rind removing machine comprising a table, a knife mounted above and for a transverse intermittent movement across the surface of the table and having its cutting edge spaced from the surface of the table, a rind guide located behind the cutting edge of the knife.

3. A bacon rind-removing machine comprising a table provided at its end with an opening, a rind guide located below the top of the table and having a portion extending through said opening, and a knife located above the table and having its cutting edge spaced from the same.

4. A bacon rind-removing machine comprising a table having an opening, a knife located above the table, a rind guide located under the table and having a curved portion extending through said opening, and a rind-removing element located within the curved portion of the guide.

5. A bacon rind-removing machine comprising a table, a guard pivotally mounted above the table, a knife movably mounted on the guard and spring means for holding the guard and knife in a depressed position.

6. A bacon rind-removing machine comprising a table, a guard located above the table, a knife mounted for movement on the guard, spring means for holding the knife at a normal position on the guard, and means adapted to be encountered by the knife to move the same upon the guard.

7. A bacon rind-removing machine comprising a table, a guard located above the table and pivotally supported, a knife movably mounted on the guard and having an arm, said arm having a non-circular portion, a finger-piece slidably mounted on said non-circular portion, the table having a standard against which the finger-piece bears, a collar mounted on the arm, and a spring interposed between the collar and finger-piece.

8. A bacon rind removing machine comprising a table, a rind guide located under the table and having a curved portion which extends above the top of the table, a knife located above the table, and a rind-removing element located within the curved portion of the guide and having radially disposed fingers adapted to engage the rind.

9. A bacon rind removing machine comprising a table, a guide located under the table and having a portion which extends above the top of the table, a knife located above the table, a rind engaging means adapted to coöperate with the guide, and a fender for removing the rind from the rind means.

10. A bacon rind removing machine comprising a table, a knife located above the table, a guide located under the table and having a portion which extends above the top of the table, disks journaled below the table top and having radially disposed fingers, and a fender having recesses through which said fingers pass.

11. A bacon rind removing machine comprising a table, a rind removing element, a depository for the rind, a yielding element under which the bacon feeds after the removal of the rind.

12. A bacon rind removing machine comprising a table, a knife mounted above the surface of the table having its cutting edge spaced from the surface of the table, said knife having an intermittent movement across the surface of the table.

13. A bacon rind removing machine comprising a table, a knife mounted above the surface of the table having its cutting edge spaced from the surface of the table, said knife in conjunction with a hingedly mounted toothed finger bar having an intermittent movement across the surface of the table.

14. A bacon rind removing machine comprising a table, a hingedly mounted toothed finger bar acting in conjunction with a knife having its cutting edge spaced from the surface of the table.

15. A bacon rind removing machine comprising a table, a rind removing element, a guide for the part of the bacon from which the rind has been removed and a receptacle for the removed rind.

16. A bacon rind removing machine comprising a table, a rind removing element yieldingly mounted, a guide for the part of the bacon from which the rind has been removed and a receptacle for the removed rind.

17. A bacon rind removing machine comprising a table, mounted to reciprocate, a rind removing element having a dual intermittent action therewith.

18. A bacon rind removing machine comprising a reciprocable table, a rind removing element mounted above and movable with the table, and having a reciprocating movement independent of the table.

19. A bacon rind removing machine, comprising a reciprocable table, a rind removing element mounted above and movable with the table, and having a reciprocating movement independent thereof, and an intermittent rind feeding member.

20. A bacon rind removing machine comprising a table mounted to reciprocate, a means carried by the table for feeding the removed rind intermittently into a receptacle carried by the table.

21. A bacon rind removing machine comprising a table mounted to reciprocate, a rind removing element carried thereby, a receptacle carried by the table into which the removed rind is fed, a means also carried by the table for feeding the removed rind into the receptacle in an intermittent manner.

22. A bacon rind removing machine, comprising a reciprocable table, a pivotal finger member mounted above and movable with the table, a rind removing element mounted to have a reciprocating shearing movement independent of the table.

23. A bacon rind removing machine comprising a table mounted to reciprocate, a shearing means intermittent in action carried by the table for removing the rind and a receptacle into which the removed rind is fed.

24. A bacon rind removing machine comprising a table mounted to reciprocate, a shearing means having a dual intermittent action carried by the table for removing the rind and a receptacle into which the removed rind is fed.

25. A bacon rind removing machine comprising a table mounted to reciprocate, a shearing means intermittent in action carried by the table for removing the rind, a means carried by the table and acting in unison with the shearing means for feeding the removed rind into a rind holding receptacle.

26. A bacon rind removing machine comprising a table mounted to reciprocate, a shearing means having a dual intermittent action carried by the table for removing the rind, a means carried by the table and acting in unison with the shearing means for feeding the removed rind into a rind holding receptacle.

27. A bacon rind removing machine comprising a table mounted to reciprocate, a rind removing element intermittent in action carried by the table, a means for imparting intermittent action to the rind removing element.

28. A bacon rind removing machine comprising a table mounted to reciprocate, a rind removing element having a dual intermittent action carried by the table, a means for imparting a dual intermittent action to the rind removing element.

29. A bacon rind removing machine, comprising a reciprocable table, a bacon supporting member above and spaced from the table, a finger bar pivoted to said member, a rind removing element upon said bar, positive and spring actuated means for imparting a reciprocating shearing action to said element relative to said finger bar.

30. A bacon rind removing machine comprising a table mounted to reciprocate, a rind removing element intermittent in action carried by the table, a spring actuated means for imparting intermittent action to the rind removing element.

31. A bacon rind removing machine comprising a table mounted to reciprocate, a rind removing element having reverse action carried by the table, a spring actuated means for imparting action to the rind removing element intermittently.

32. A bacon rind removing machine comprising a reciprocable table, a rind removing element thereon having a positive and a spring pressed movement.

33. A bacon rind removing machine, comprising a reciprocable table, a rind removing element thereon, having independent positive and spring actuated movements, and a rind feeding member.

34. A bacon rind removing machine, comprising a reciprocable table, a rind removing element thereon having independent positive and spring actuated movements, and a rotary rind feeding member.

35. A bacon rind removing machine, comprising a reciprocable table, a rind removing element mounted thereon and having independent positive and spring actuated movements, a rotary rind feeding member and a guide coöperating with the latter.

36. A bacon rind removing machine, comprising a reciprocable table, a rind removing element mounted thereon, a bacon support above the table and movable therewith, means for imparting independent positive and spring actuated movements to said element, and a presser member above said support.

37. A bacon rind removing machine comprising a reciprocable table, a rind supporting member above the table, and movable therewith, a finger bar pivoted to said support, a rind removing element, having a shearing action with said bar, and adapted to have a positive movement in one direction and a spring actuated movement in the other direction independent of the movement of the carriage.

38. A bacon rind removing machine, comprising a reciprocable table having slotted standards thereon, a bacon support secured to said standards, a finger bar pivoted to said support, a rind removing element mounted upon said bar and having an integral projection at one end thereof extending through one of the slotted standards, and stationary means against which said projection contacts, as the carriage is moved in one direction to cause a positive longitudinal movement to be imparted to said element.

39. A bacon rind removing machine, comprising a reciprocable table having slotted standards thereon, a bacon rind removing element and support therefor secured to said standards, said element having a contracted projection at one end extending through a slot of a standard, and stationary means against which said projection contacts as the carriage moves in one direction, and spring actuated means for imparting a longitudinal movement to the element as the carriage moves in the opposite direction.

40. A bacon rind removing machine, comprising a reciprocable table, having slotted standards thereon, a bacon support having projections which are secured to said standards, a finger bar pivoted to said bar, a bacon rind cutting element pivoted to said bar and having a contracted projection at one end extending through the slot of a standard stationary means against which said projection of the cutting element is adapted to contact as the carriage moves in one direction, and spring means for moving the element in the opposite direction, and means for holding said element and bar in sliding contact with each other.

41. A bacon rind removing machine, comprising a reciprocable table with slotted standards rising therefrom, a bacon supporting member attached to said standards, a finger bar pivoted to the end of said member and disposed at an inclination, a rind removing element having a cutting edge designed to have a shearing action relative to the fingered edge of said bar, said element provided with a contracted projection movable through the slot in one of said standards, stationary means against which said projection is adapted to contact as the carriage moves in one direction, and a spring for returning the element to its normal position, independent of the movement of the table, and a presser member above said supporting member.

42. A bacon rind removing machine, comprising a reciprocable table with slotted standards rising therefrom on opposite edges of the table, a bacon supporting member above and spaced from the table, a finger bar pivoted to the end of said member, and having a recessed upper face, a rind removing element seated in and adapted to have a reciprocating movement within said recess, means for holding the cutting edge of said element yieldingly against the face of the rind being cut, positive means for actuating said element in one direction as the table moves in one direction, and a spring for returning the element to its normal position.

43. A rind removing machine, comprising a reciprocable table, a bacon supporting member above and spaced from the table, a finger bar pivoted to said member, a rind removing element having a serrated cutting edge adapted to have a reciprocating shearing movement relative to the fingered edge of said bar, said element having slots therein, pins upon said bar passing through said slots and adapted to limit the longitudinal movements of the element.

44. A rind removing machine comprising a reciprocable table, with slotted standards, a bacon supporting member attached to said standards, a finger bar pivoted to the end of said member, a rind removing element mounted upon the case of said bar and having a contracted projection extending through the slot in one of said standards, a sleeve fastened to said projection, a spring interposed between said sleeve and the end of the rind removing element, a stationary means having an aperture therein in alinement with said projection and which it enters as the carriage moves in one direction, causing a longitudinal movement to be imparted to the element, as it puts said spring under tension.

In testimony whereof I affix my signature in the presence of two witnesses.

ARTHUR H. HIEATZMAN.

Witnesses:
JAMES A. MURRAY,
C. M. REA.